United States Patent
Sjodin (10) Patent No.: US 7,764,857 B2
(45) Date of Patent: Jul. 27, 2010

(54) CABLE MANAGEMENT SYSTEM WITH TWIST LATCH

(75) Inventor: Chad J. Sjodin, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 138 days.

(21) Appl. No.: 11/510,523

(22) Filed: Aug. 25, 2006

(65) Prior Publication Data
US 2008/0050084 A1    Feb. 28, 2008

(51) Int. Cl.
H05K 7/14    (2006.01)
G02B 6/00    (2006.01)

(52) U.S. Cl. .................. 385/135; 385/134; 174/535; 174/545

(58) Field of Classification Search ............ 385/134, 385/135; 248/221.11; 174/135, 72 A, 58, 174/99 R, 535, 545
See application file for complete search history.

(56) References Cited

U.S. PATENT DOCUMENTS

| | | |
|---|---|---|
| 693,127 A | 2/1902 | Garnder et al. |
| 1,751,463 A | 3/1930 | Clayton |
| 2,913,210 A | 11/1959 | Tichnor |
| 3,159,368 A | 12/1964 | Bhlbin |
| 3,204,776 A | 9/1965 | Brown et al. |
| 3,315,816 A | 4/1967 | Mallory |
| 3,388,806 A | 6/1968 | Cunningham, Jr. et al. |
| 3,420,482 A | 1/1969 | Taylor |
| 3,512,653 A | 5/1970 | Erismann |
| 3,516,552 A | 6/1970 | Salava |
| 3,986,318 A | 10/1976 | McConnell |
| 4,303,217 A | 12/1981 | Garfinkle |
| 4,405,108 A | 9/1983 | Muirhead |
| 4,441,619 A | 4/1984 | Gibitz |
| 4,527,760 A | 7/1985 | Salacuse |
| 4,619,428 A | 10/1986 | Bailey |
| 4,681,233 A | 7/1987 | Roth |
| 4,768,660 A | 9/1988 | Handler et al. |
| 5,143,331 A | 9/1992 | Robert |
| 5,163,567 A | 11/1992 | Betts |
| 5,165,640 A | 11/1992 | Williams, III |
| 5,379,976 A | 1/1995 | DeGirolamo |

(Continued)

FOREIGN PATENT DOCUMENTS

EP    1 160 605 A2    5/2001

(Continued)

OTHER PUBLICATIONS

Exhibit A, "Next Generation Frame (NGF) Product Family Ordering Guide," *ADC Telecommunications, Inc.*, 2 pages, Copyright 1998.

(Continued)

*Primary Examiner*—Uyen-Chau N Le
*Assistant Examiner*—John M Bedtelyon
(74) *Attorney, Agent, or Firm*—Merchant & Gould P.C.

(57) ABSTRACT

A cable management assembly, and methods related thereto, including a panel having a plurality of discrete openings, including first shaped apertures and second shaped apertures. The assembly further including cable management devices having low-profile mounting arrangements. The low-profile mounting arrangements being configured to mount the cable management devices at selected locations on the panel.

25 Claims, 5 Drawing Sheets

U.S. PATENT DOCUMENTS

| | | |
|---|---|---|
| 5,420,762 A | 5/1995 | Lewis |
| 5,588,631 A | 12/1996 | Yee |
| 5,640,482 A | 6/1997 | Barry et al. |
| 5,653,349 A | 8/1997 | Dana et al. |
| 5,738,020 A | 4/1998 | Correia |
| 5,758,002 A | 5/1998 | Walters |
| 5,778,130 A | 7/1998 | Walters et al. |
| 5,785,190 A | 7/1998 | Otema |
| 5,791,502 A | 8/1998 | Bietz et al. |
| 5,930,972 A | 8/1999 | Benner et al. |
| 6,003,685 A | 12/1999 | Malin |
| 6,115,977 A | 9/2000 | Hornberger et al. |
| 6,123,400 A | 9/2000 | Nicolai et al. |
| 6,129,316 A | 10/2000 | Baur |
| 6,131,347 A | 10/2000 | Hornberger et al. |
| 6,170,673 B1 | 1/2001 | Nicolai |
| 6,189,847 B1 | 2/2001 | Hart |
| 6,193,198 B1 | 2/2001 | Baur et al. |
| 6,238,028 B1 | 5/2001 | Benner et al. |
| 6,266,250 B1 | 7/2001 | Foye |
| 6,267,254 B1 | 7/2001 | Chen |
| 6,270,281 B1 | 8/2001 | Ruusuvuori |
| 6,282,854 B1 | 9/2001 | Vos et al. |
| 6,289,618 B1 | 9/2001 | Kump et al. |
| 6,307,999 B1 * | 10/2001 | Daoud ............... 385/135 |
| 6,352,164 B1 | 3/2002 | Hyattte et al. |
| 6,363,198 B1 | 3/2002 | Braga et al. |
| 6,397,533 B1 | 6/2002 | Hornberger et al. |
| 6,398,149 B1 | 6/2002 | Hines et al. |
| 6,405,984 B1 | 6/2002 | Simons et al. |
| 6,423,898 B1 | 7/2002 | Croker |
| 6,443,320 B1 | 9/2002 | Herzog et al. |
| 6,481,583 B1 | 11/2002 | Black et al. |
| D467,793 S | 12/2002 | Zadak |
| D469,003 S | 1/2003 | Valiulis |
| 6,516,955 B1 | 2/2003 | Dudhwala et al. |
| 6,581,788 B1 | 6/2003 | Winig et al. |
| 6,595,379 B1 | 7/2003 | Powell |
| 6,684,583 B2 | 2/2004 | Hodges et al. |
| 6,724,637 B2 * | 4/2004 | Li et al. ............... 361/760 |
| 6,973,249 B2 * | 12/2005 | Daoud ............... 385/134 |
| 7,070,021 B1 | 7/2006 | McKinney |
| 7,083,051 B2 | 8/2006 | Smith et al. |
| 7,219,808 B2 | 5/2007 | Wright et al. |
| 7,298,951 B2 * | 11/2007 | Smrha et al. ............... 385/135 |
| 7,677,400 B2 * | 3/2010 | Bayazit et al. ............... 211/26 |
| 2004/0094491 A1 | 5/2004 | Smith et al. |
| 2004/0240823 A1 * | 12/2004 | Daoud ............... 385/134 |
| 2006/0228087 A1 * | 10/2006 | Bayazit et al. ............... 385/135 |

FOREIGN PATENT DOCUMENTS

| | | |
|---|---|---|
| FR | 2 701 345 A1 | 8/1994 |
| WO | WO 01/01534 A1 | 1/2001 |
| WO | WO 02/052866 A2 | 7/2002 |

OTHER PUBLICATIONS

Exhibit B, "Fiber Panel Products, Second Edition," *ADC Telecommunications, Inc.*, 3 pages, Copyright 1994, 1996.

Exhibit C, "Fiber Cable Management Products, Third Edition," *ADC Telecommunications, Inc.*, 8 pages, Copyright 1995, 1998.

Exhibit D, "Value-Added Module System," *ADC Telecommunications, Inc.*, 2 pages, Copyright 1993, 1994, 1998.

* cited by examiner

CABLE MANAGEMENT SYSTEM WITH TWIST LATCH

TECHNICAL FIELD

The present invention relates generally to devices and methods for enhancing cable management of telecommunications systems. More particularly, the present invention relates to a cable management panel and devices for managing cables of telecommunications systems.

BACKGROUND

Telecommunications systems utilize cables, such as fiber optic cables and copper twisted pair cables, for interconnecting pieces of telecommunications equipment or components. The systems commonly include telecommunication racks that hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves efficiently routing cables to minimize the occupied space, and routing cables in an orderly manner so as to reduce the likelihood of cable tangling. Ease of cable organization is also a factor related to effective cable management.

In general, conventional arrangements for managing cables can be improved.

SUMMARY

The present disclosure relates to a cable management assembly including a panel to which cable management devices can be selectively mounted. One aspect of the assembly concerns a low-profile back plate of the cable management devices. The low-profile back plate is sized to provide greater versatility for use in applications where space is limited. Another aspect of the assembly concerns the panel. The panel includes a plurality of discrete openings including first shaped apertures and second shaped apertures. Yet another aspect of the assembly concerns the combination of the devices and the panel wherein the combination provides a cable management assembly that is easy to use.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
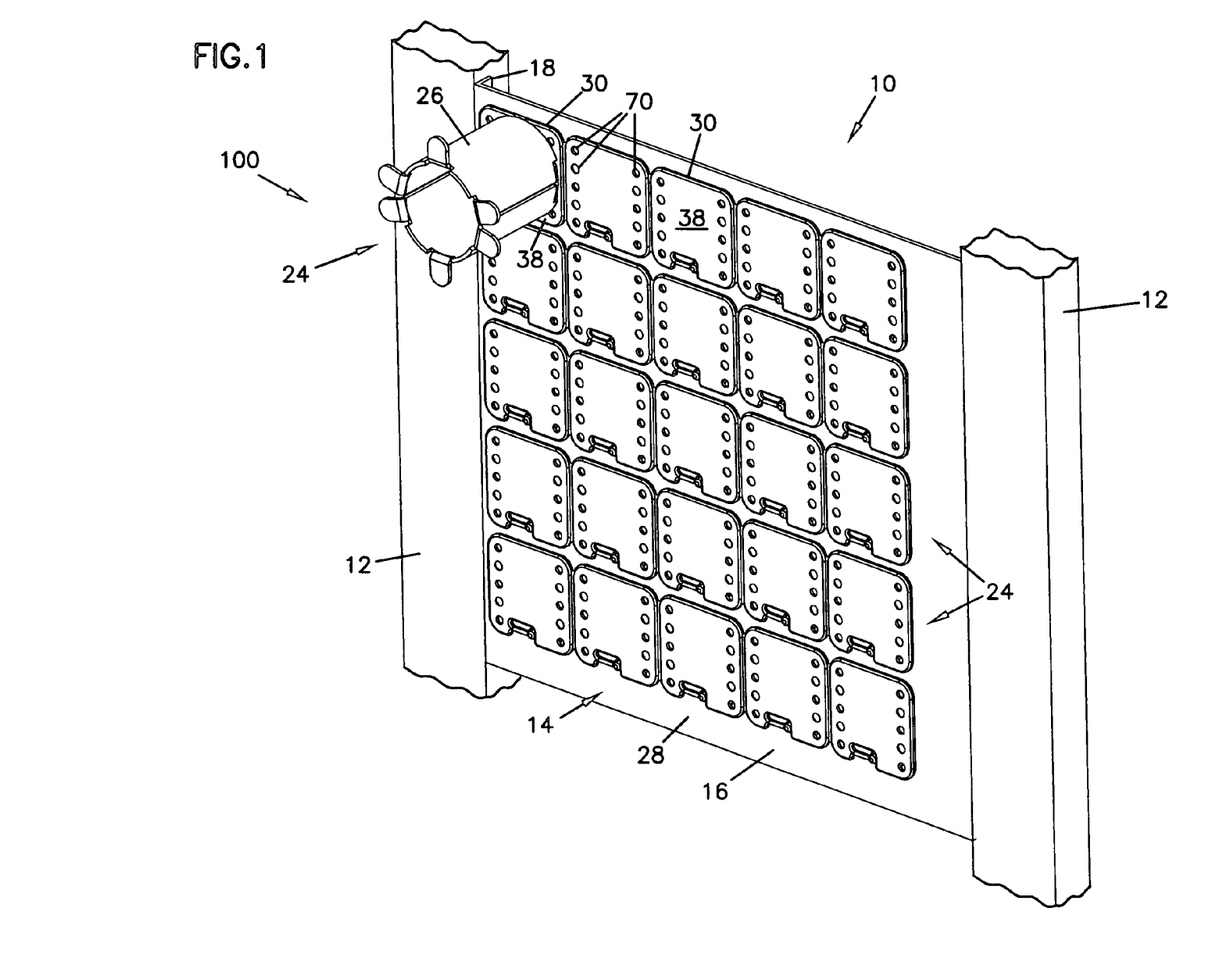
FIG. 1 is a front perspective view of one embodiment of a cable management system, partially shown, and including a cable management assembly in accordance with the principles disclosed.

Referring to FIG. 1, a telecommunications system 100 for managing cables interconnected to telecommunications components is illustrated. The telecommunications system 100 includes a cable management assembly 10 mounted between adjacent first and second telecommunication racks 12 (schematically and only partially represented). The telecommunication racks 12 can be configured to receive a variety of telecommunications components. For example, the racks 12 can hold fiber termination panels (not shown) having fiber optic adapters. Similar telecommunication racks 12 to which the present cable management assembly 10 can be mounted are described in U.S. Patent Publication No. 20040094491, which application is incorporated herein by reference. In alternative embodiments, the cable management assembly 10 can be used with other telecommunication structures to manage cables. For example, the cable management assembly 10 can be mounted within a cabinet or within a termination panel enclosure.

The cable management assembly 10 includes a panel 14 (e.g., riser structure or back plane). The panel 14 includes an interface portion 16 and first and second mounting structures 18, 20 (see also FIG. 2) configured to mount or couple the cable management assembly 10 to the adjacent telecommunication racks 12. In one embodiment, the first and second mounting structures 18, 20 include flanges that extend generally perpendicular or outward from the interface portion 16 of the panel 14. In the illustrated embodiment, the first and second mounting flanges 18, 20 are located along the sides of the panel 14; although the flanges may also be located along the top and bottom of the panel as well. Fasteners, such as rivets or screws, are typically used to mount the panel 14 to the telecommunication racks 12.

Figure 2:
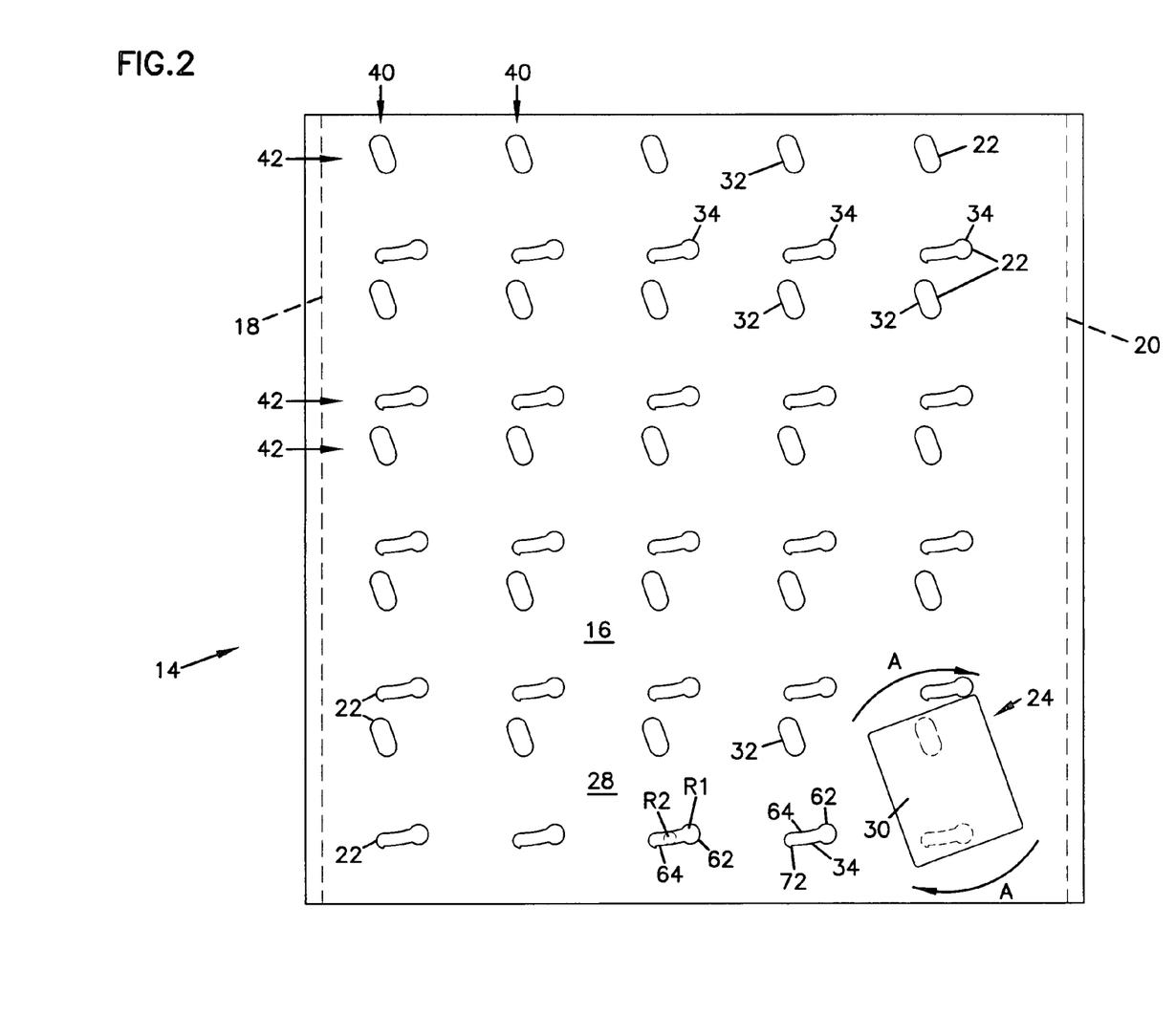
FIG. 2 is a front elevation view of a panel of the cable management assembly of FIG. 1, shown in isolation.

Referring to FIG. 2, the interface portion 16 of the panel 14 defines a plurality of discrete openings 22. Cable management devices 24 (FIG. 1) used to manage cables are secured to the panel 14 at the discrete openings 22. The discrete openings 22 are provided such that a user can organize and arrange the devices, and accordingly the cables, in a variety of configurations, as needed for the particular application.

With the present cable management assembly 10, a user has the flexibility to choose from a number of different cable management devices, each being configured to secure to the panel 14. FIG. 1 illustrates the panel 14 with one complete device 24 including a device body 26 and a back plate 30. For purposes of clarity, only one complete device with a device body 26 is shown. The other devices 24 are shown with only the back plate 30 to which an associated device body attaches.

The device bodies (e.g. 26) can include a number of cable managing structures. The illustrated device body of FIG. 1 includes a spool 26 that is attached to a front surface 38 of the back plate 30. Fastener holes 70 are provided in the back plate 30 of the device 24 to receive fasteners (not shown) for securing the various device bodies to the back plate. In the illustrated embodiment, the fastener holes 70 are vertically aligned along the sides of the back plate 30; although a variety of hole configurations or patterns can be used in association with the variety of device bodies. In addition, other ways of fastening or attaching the device body to the back plate can be employed.

The spool 26 of FIG. 1 can be used to hold excess cabling and includes a radius limiting surface or curved surface that prevents cables from exceeding a minimum bend radius. The spool is only one example of a cable management device body that can be attached to the back plate 30 and secured to the panel 14. Other cable management device bodies can include, for example, cable guides, tie-off brackets, edge protectors, channel guides, and radius limiters. Such device bodies are described in U.S. Patent Application No. 20040094491, previously incorporated herein by reference. Additional types of cable management devices or device bodies may include cable termination devices and flip-out trays. It is to be understood that the spool 26 is only one example of a number of cable management devices and device bodies that can be used with the presently disclosed cable management system 100.

Referring back to FIG. 2, the plurality of discrete openings 22 of the panel 14 is arranged to permit a user to position any of the different cable management devices 24 at a variety of locations on the panel 14 of the cable management assembly 10. In the illustrated embodiment, the plurality of discrete openings 22 includes a first type of shaped apertures 32 and a second type of shaped apertures 34. The first and second types of shaped apertures 32, 34 are configured to securely attach the cable management devices 24 to the interface portion 16 of the panel.

As shown in FIG. 2, the first and second shaped apertures 32, 34 of the discrete openings 22 are arranged on the panel 14 in an array of vertical columns 40 and horizontal rows 42. The columns and rows 40, 42 of the first and second shaped apertures 32, 34 define a repeating pattern that spans a majority of the width of the panel and that extends along a majority of the height of the panel 14. The pattern preferably permits placement of the devices at various selected vertical and horizontal locations to provide a variety of cable management systems.

While the repeating pattern of the panel 14 includes a repeating pattern of vertical columns and/or horizontal rows, it will be appreciated that the arrangement of discrete openings of the illustrated embodiment of the present disclosure need not be limited to vertical and horizontal columns and rows. Rather, array arrangements oriented at various angular degrees from vertical and horizontal are within the scope of the present disclosure. In yet another alternative embodiment, the discrete openings 22 may be more randomly formed in the panel 14.

Still referring to FIG. 2, in the illustrated embodiment, the first and second shaped apertures 32, 34 of the panel 14 are each arranged in rows of similarity. That is, the discrete openings 22 of the panel 14 are arranged to provide rows of only the first shaped aperture 32 and rows of only the second shaped aperture 34. The rows of the first shaped apertures 32 and the rows of the second shaped apertures 34 alternate along the height of the panel 14. Other row and column patterns of the first and second shaped apertures 32, 34 can also be used.

Figure 3:
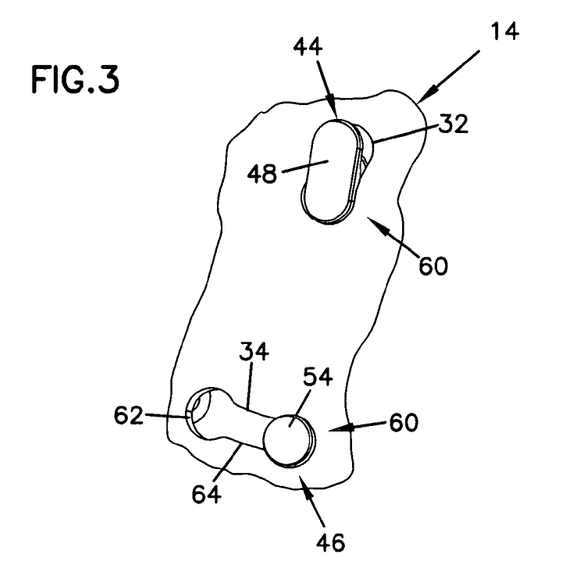
FIG. 3 is a partial, rear perspective view of the panel of the cable management assembly of FIG. 2.
Figure 4:
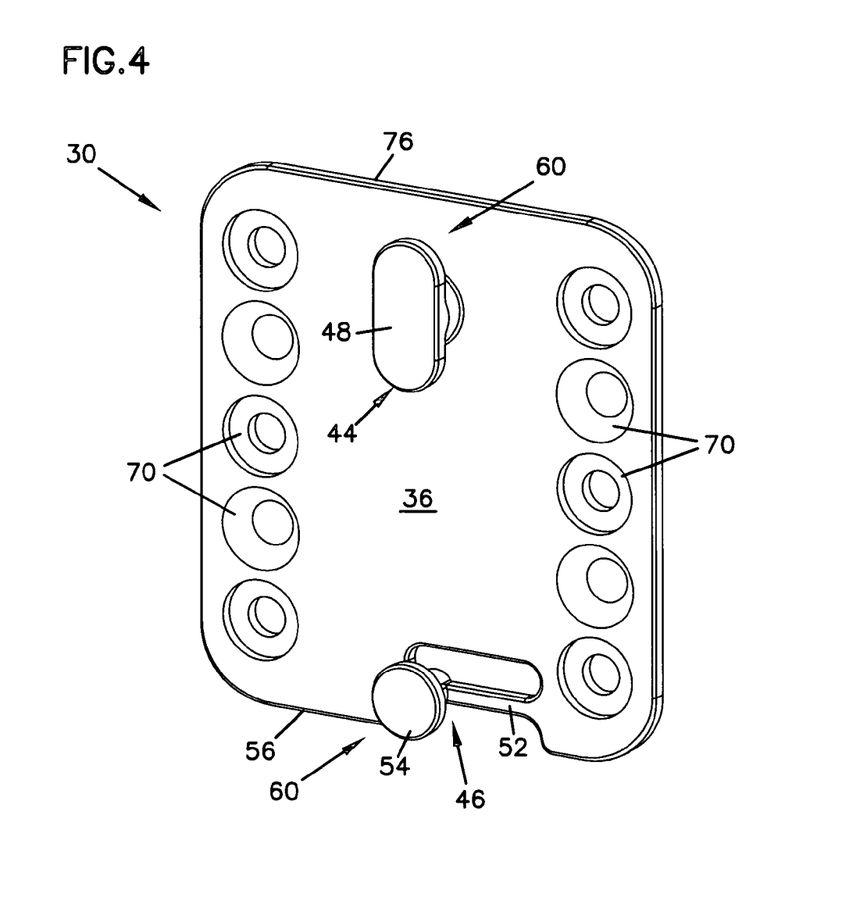
FIG. 4 is a rear perspective view of a back plate of a device of the cable management assembly of FIG. 1, shown in isolation.

Referring now to FIGS. 3 and 4, the back plate 30 of the cable management devices 24 includes securing structure 60 that securely attaches the device to the panel 14. The discrete openings 22 of the panel 14 are sized and shaped to receive mating elements of the securing structure 60 (FIG. 4) of the back plate 30. The securing structure 60 of the cable management devices 24 is configured to permit attachment and detachment of the device 24 from a front side 28 (FIG. 1) of the panel 14 (i.e., attachment and detachment can be performed via access to only the front side 28). This simplifies use of the present cable management assembly 10 by eliminating the need for a user to access the back side of the panel 14 for installation or removal of the device 24.

Figure 6:
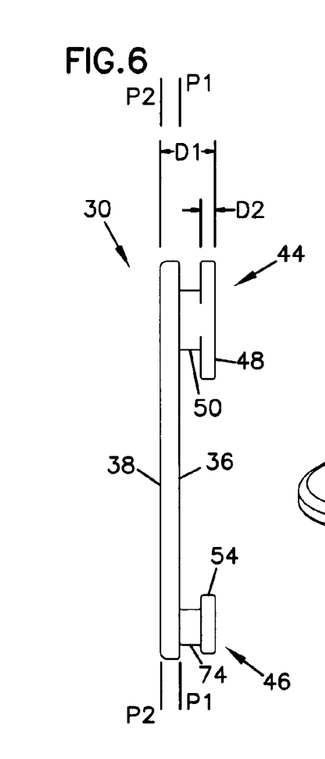
FIG. 6 is a side elevation view of the back plate of FIG. 5.

Referring still to FIGS. 3 and 4, the securing structure 60 of the back plate 30 includes first and second attaching elements 44, 46. The first and second attaching elements 44, 46 correspond to the shape of the first and second shaped apertures 32, 34. In particular, the first attaching element 44 has a keying piece 48 sized and shaped to correspond to the first shaped aperture 32 of the panel 14. In the illustrated embodiment, the first shaped aperture 32 has an elliptical or oval shape. The keying piece 48 correspondingly has an elliptical or oval shape. Other corresponding aperture and keying piece shapes can be used. When attaching the back plate 30 to the panel 14, the back plate 30 is oriented so that keying piece 48 fits through the first shaped aperture 32. As shown in FIG. 6, the keying piece 48 is offset or spaced a distance from a rear surface 36 of the back plate 30 by a neck 50. The distance accommodates the thickness of the panel 14 when the back plate 30 is attached to the panel 14.

Referring back to FIGS. 3 and 4, the second attaching element 46 includes a flexible lever arm 52 (e.g., a spring arm) and a locating piece 54. The locating piece 54 of the second attaching element 46 is sized and shaped to correspond to the second shaped aperture 34 of the panel 14. The second shaped aperture 34 (FIG. 2) of the panel 14 defines a receiving aperture portion 62, a slide aperture portion 64, and a notch 74. The receiving aperture portion 62 is located at a first end of the slide aperture portion 64, and the notch 74 is located at a second opposite end of the slide aperture portion. In the illustrated embodiment, the receiving aperture portion 62 has a circular shape. The locating piece 54 (FIG. 3) correspondingly has a circular shape. Other corresponding aperture and locating piece shapes can be used. When attaching the back plate 30 to the panel 14, the back plate 30 is oriented so that locating piece 54 fits through the receiving aperture portion 62 of the second shaped aperture 34. As shown in FIG. 6, the locating piece 54 is offset or spaced a distance from the rear surface 36 of the back plate 30 by a neck 74. The distance accommodates the thickness of the panel 14 when the back plate 30 is attached to the panel 14.

Figure 5:
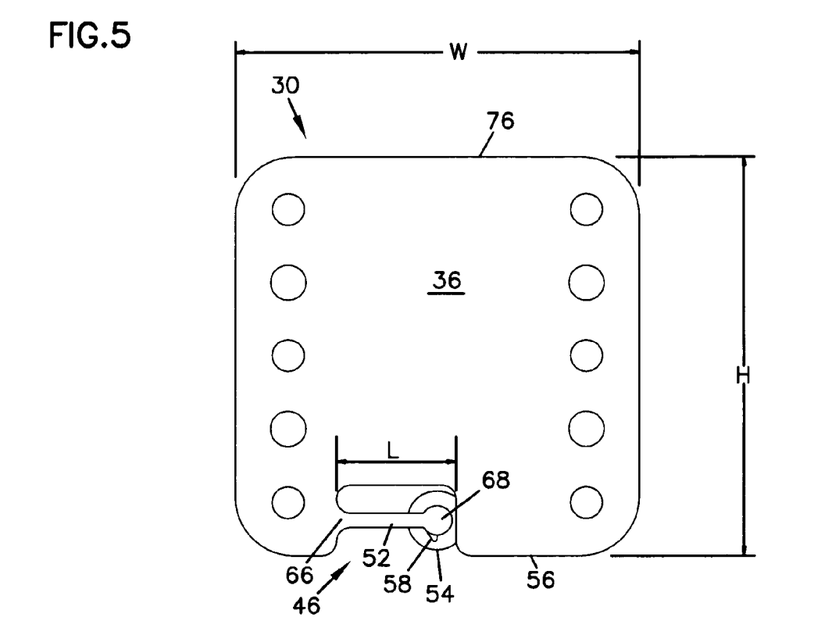
FIG. 5 is a front elevation view of the back plate of FIG. 4.

The flexible lever arm 52 (FIG. 4) of the second attaching element 46 secures or fixes the cable management device 24 to the panel 14. The flexible arm 52 is formed adjacent to a bottom edge 56 of the back plate 30. As shown in FIG. 5, the arm 52 has a length L that extends from a first end 66 to a second free end 68. The arm 52 is oriented relative to the rear surface 36 of the back plate such that the length L of the arm 52 extends generally parallel with a plane P1 (FIG. 6) of the rear surface 36, as opposed to being perpendicular. In the illustrated embodiment, the flexible lever arm 52 resides within (i.e., between) the plane P1 defined by the rear surface 36, and a plane P2 defined by the front surface 38.

Figure 7:
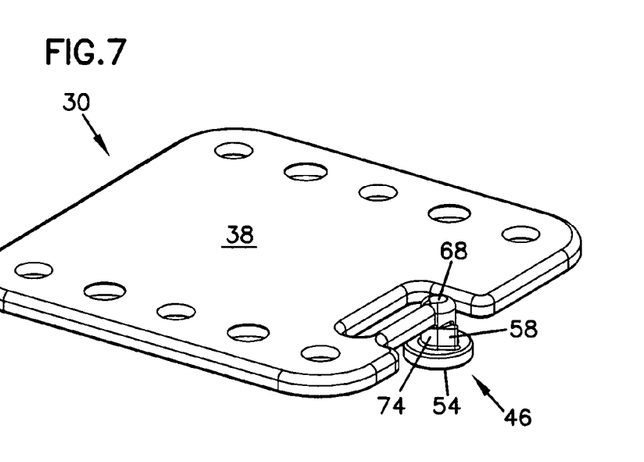
FIG. 7 is a bottom perspective view of the back plate of FIG. 4.

Referring attain to FIG. 5, the locating piece 54 of the second attaching element 46 is provided at the free end 68 of the flexible arm 52. The first end 66 of the arm 52 is integrally constructed from or integrally connected to the back plate 30. A latch or catch 58 is located adjacent to the free end 68 of the flexible arm 52. In particular, as shown in FIG. 7, the catch 58 is located on the neck 74 of the locating piece 54. As will be described in greater detail hereinafter, the catch 58 provides an easy to use snap-fit connection.

The presently disclosed back plate 30 of the cable management device 24 is a low-profile back plate. In some conventional arrangements, the attachments extend from a back surface a distance that requires greater clearance space to accommodate the attachments. When mounting conventional arrangements within a cabinet, for example, accommodations must be made for the required clearance space. As can be understood, space within a cabinet is often very limited. The present back plate 30 has a low-profile that requires less space and is more easily adaptable for use in cabinets.

In particular, referring to FIG. 5, the present back plate has a width W, a height H, and a depth D1 (FIG. 6). The width W of the back plate is preferably between 1.25 and 3.0 inches; more preferably between about 1.5 and 2.0 inches. Similarly, the height H of the back plate is preferably between 1.25 and 3.0 inches; more preferably between about 1.5 and 2.0 inches. Other sizes of back plates can be used in accordance with the principles disclosed.

The low-profile feature of the present back plate is defined by the depth D1 of the back plate 30; and more particularly, by a dimension D2 of the keying piece 48 and the locating piece 54 of the back plate 30. The dimension D2 is the distance from the panel 14 which the attaching elements 44, 46 extend. In particular, referring to FIG. 6, the attaching elements 44, 46 extend outward from the rear surface 36 of the back plate 30 a total distance no greater than the sum of the panel thickness and the dimension D2. The dimension D2 is therefore generally the clearance space required to accommodate the device 24.

The overall depth D1 of the back plate is typically less than 0.260 inches; more preferably less than about 0.240 inches. As can be understood, the overall depth D1 depends upon the panel thickness, which is accommodated by the necks 50, 74 of the attaching elements. In the illustrated embodiment, the depth D1 of the back plate 30 is about 0.230 inches. The dimension D2, which partially defines the depth D1 of the back plate, is defined by the thickness of the keying piece 48 and the locating piece 54. The dimension D2 is preferably less than 0.08 inches; more preferably less than about 0.06 inches.

The arrangement and orientation of the flexible lever arm 52 (residing within or between the planes P1, P2 of the front and rear surfaces 38, 36 of the back plate 30) and the reduced thickness dimension D2 of the keying and locating pieces 48, 54 permits the low-profile back plate 30 to be mounted within enclosures that have limited space. The low-profile design of the back plate 30 requires less clearance space for attaching devices to panels and therefore provides greater versatility for use in applications previously not feasible.

FIGS. 2 and 3 illustrate the installation of the back plate 30 of the cable management device 24 to the panel 14. While the illustrations show only a back plate 30, it is to be understood that the chosen device body (e.g. 26) is secured to the front surface 38 of the back plate 30 prior to attaching the back plate 30 to the panel 14.

Installation of the device 24 is tool-free; that is, the back panel 30 is designed to secure to the panel 14 without the use of tools or separate fastening components. The cable management device 24 attaches to and detaches from the panel 14 from one side (e.g., the front side 28) to simplify the installation and removal of the device.

To install a device, the device is oriented such that the keying piece 48 of the first attaching element 44 is aligned with the first shaped aperture 32, and such that the locating piece 54 of the second attaching element 46 is aligned with the receiving aperture portion 62 of the second shaped aperture 34. This particular orientation is schematically illustrated in FIG. 2. While aligned, the first and second attaching elements 44, 46 are inserted through the first and second shaped apertures 32, 34. The device 24 is then twisted or turned clockwise, as represented by arrows A in FIG. 2.

The device is twisted such that the neck 74 (FIG. 5) of the second attaching element 46 slides along the slide aperture portion 64 of the second shaped aperture 34. The receiving aperture portion 62 of the second shaped aperture 32 has a radius R1 (FIG. 2) that is greater than the radius R2 of the slide aperture portion 64. The radius R1 of the receiving aperture portion 62 is sized so that both the locating piece 54 and the catch 58 of the second attaching element 46 fit through the receiving aperture portion 62 without interference. However, when the device is twisted, the catch 58 contacts the slide aperture portion 64 of the second shaped aperture 34 and biases the flexible lever arm 52 upward, i.e., away from the bottom edge 56 (FIG. 4) of the back plate 30.

As previously described, the flexible lever arm 52 resides within the planes P1, P2 defined by the front and rear surfaces 38, 36 of the back plate 30; preferably, the flexible lever arm is configured to flex in a direction (e.g., upward toward a top edge 76 of the back plate 30) such that the arm 52 remains within or between the planes P1, P2 defined by the back plate 30. This arrangement maintains the low-profile feature of the present back plate 30.

As the device 24 continues to twist (i.e., pivot or turn) in the clockwise direction A, the catch 58 follows the slide aperture portion 64 until the catch 58 seats within or engages the notch 72 (FIG. 2) formed at the end of the slide aperture portion 64. The catch 58 of the back plate 30 and the notch 72 of the panel apertures 34 define a snap-fit connection that securely attaches the device 24 to the panel 14 without the use of tools.

While the back plate 30 is being rotated or turned, the first attaching element 44 is also rotating or turning within the first shaped aperture 32. As shown in FIG. 3, the keying piece 48 thereby turns to a locked position (i.e., a non-aligned or rotationally offset position) so that the back plate 30 is axially secured to the panel 14. The locating piece 54 of the second attaching element 46 is also captured to axially secure the back plate 30 to the panel. In particular, axial movement of the back plate 30, relative to the panel 14, is prevented when the neck 74 of the second attaching element 46 is positioned within the slide aperture portion 64 of the second shaped aperture 34.

When snap-fit to the panel 14, the cable management device 24 cannot be inadvertently pulled, pushed, or pivoted out of position. The securing structure 60 of the device 24 provides an easy-to-use, but reliably attachment. To remove the cable management device 24 from the panel, the flexible lever arm 52 is simple flexed upward to disengage the catch 58 of the back plate 30 from the notch 72. The device 24 can then be pivoted or twisted in a counterclockwise direction so that the keying piece 48 and the locating piece 54 of the first and second attaching elements 44, 46 align with the apertures 32, 34 to detach or remove the device 24 from the panel 14. Removal of the device 24 is again accomplished without the use of tools and from one side of the panel, i.e., the front side 28.

Figure 8:
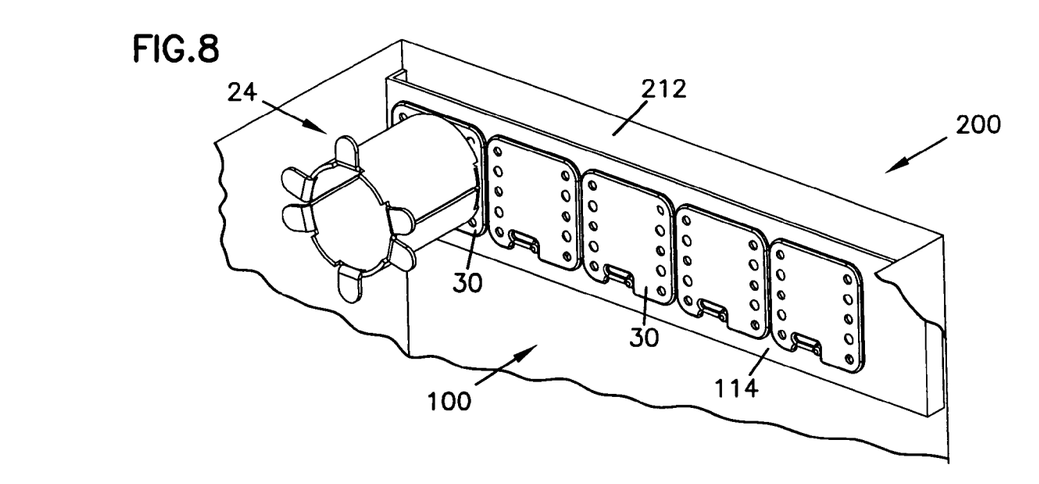
FIG. 8 is a front perspective view of another embodiment of a cable management system, partially shown, and including another cable management assembly in accordance with the principles disclosed.
Figure 9:
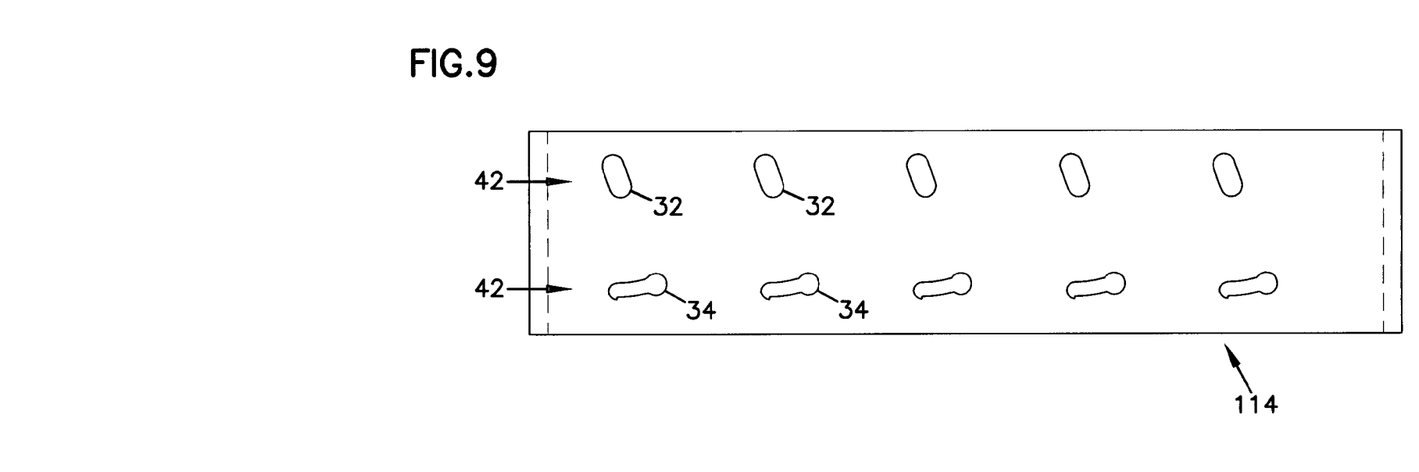
FIG. 9 is a front elevation view of a panel of the cable management assembly of FIG. 8, shown in isolation.

FIGS. 8 and 9 illustrate another embodiment of a telecommunications system 200 including a cable management assembly 110. The cable management assembly 110 includes the same features previously described with respect to the cable management assembly 10 of FIG. 1, but is sized to fit within a smaller area. In particular, the cable management assembly 110 includes a panel 114 that is sized to fit within a cabinet 212 (schematically represented). In the illustrated embodiment, the panel 114 includes only a single row 42 of first shaped apertures 32 and a single row 42 of second shaped apertures 34, as space is often limited inside the cabinet 212. As previously described, the low-profile back plate 30 of the devices 24 requires less clearance space and is particularly useful for managing cables within cabinets.

The presently disclosed cable management assemblies 10, 110 provide flexibility in permitting a user to position any of a number of different cable management devices at a plurality of selected locations on the panel 14, 114. In particular, the preferred panel is constructed to provide a plurality of placement coordinates (i.e. vertical and horizontal locations) from which a user may choose to position the cable management devices 24. With this design, a user is not limited to a premade, fixed cable management system, which may not fit a particular need. In addition, the present cable management assembly 10, 110 is easily adapted to accommodate the changing needs of a user. That is, the securing structure (e.g., 60) of the cable management devices 24 permits a user to easily attach and detach the device to and from the panel. This feature permits a user to quickly and easily modify a system's cable management strategy to accommodate growth in a quickly changing industry.

Further, the presently disclosed devices 24 include a back plate 30 that is low-profile in design. The low-profile back plate 30 requires less clearance space for attaching devices to the panel and therefore provides greater versatility for use in applications where space is limited.

The above specification provides a complete description of the cable management assembly, system, and method. Since many embodiments of the invention can be made without departing from the spirit and scope of the invention, the invention resides in the claims hereinafter appended.

What is claimed is:

1. A cable management system, comprising:
   a) a panel defining a plurality of discrete openings, the discrete openings including first shaped apertures and second shaped apertures, the panel having a front side and a back side, the front side defining a panel plane; and
   b) a cable management device having securing structure that secures the cable management device to the panel at a selected location, the securing structure including:
      i) a back plate having a front surface that defines a front plane and a rear surface that defines a rear plane;
      ii) a first attaching element corresponding to the first shaped apertures of the panel; and
      iii) a second attaching element corresponding to the second shaped apertures of the panel, the second attaching element including a flexible lever arm;
      iv) wherein each of the first and second attaching elements extends beyond the back side of the panel a distance no greater than about 0.08 inches when the device is attached to the panel;
      v) wherein the second attaching element flexes in a direction parallel to the panel plane when attaching the device to the panel, the flexible lever arm of the second element remaining within the front and rear planes of the back plate during such flexure, the second attaching element permitting a user to selectively attach and detach the cable management device from the front side of the panel without accessing the back side of the panel.

2. The system of claim 1, wherein the flexible lever arm provides a snap-fit connection between the cable management device an the panel.

3. The system of claim 2, wherein the first attaching element projects outward from the rear surface of the back plate.

4. The system of claim 3, wherein the cable management device further includes a cable management body extending from the front surface of the back plate, the cable management body including a radius limiting surface that prevents cable from exceeding a minimum bend radius.

5. The system of claim 2, wherein the second attaching element further includes a catch located adjacent to a free end of the flexible lever arm.

6. The system of claim 2, wherein the flexible lever arm has a length defined between a first end that is interconnected to the back plate and an opposite free end, the length of the arm extending in a generally horizontal direction when the device is mounted to the panel.

7. The system of claim 2, wherein the flexible arm is accessible from the front side of the panel.

8. The system of claim 1, wherein the second shaped apertures include a receiving aperture portion and a slide aperture portion, the receiving portion having a radius greater than that of the slide aperture portion.

9. The system of claim 8, wherein the slide aperture portion is sized to capture the second attaching element to axially retain the cable management device relative to the panel.

10. The system of claim 1, wherein the second shaped apertures of the plurality of discrete openings includes a receiving aperture portion, a slide aperture portion, and a notch, the receiving aperture portion being located at a first end of the slide aperture portion, the notch being located at a second end of the slide aperture portion.

11. The system of claim 10, wherein the second attaching element includes a catch disposed adjacent to a free end of the flexible arm, the catch being arranged to engage the notch to provide a snap fit connection.

12. The system of claim 1, further including adjacent telecommunication racks, the panel being mounted between the adjacent telecommunication racks.

13. The system of claim 1, further including a telecommunications enclosure, the panel being mounted within the telecommunications enclosure.

14. A cable management system, comprising:
   a) a panel defining a plurality of discrete openings, the discrete openings including first shaped apertures and second shaped apertures, the panel having a front side and a back side, the front side defining a panel plane; and
   b) a cable management device having securing structure that secures the cable management device to the panel at a selected location, the securing structure including:
      i) a back plate having a front surface and an opposite rear surface, the front surface defining a front plane, the rear surface defining a rear plane;
      ii) a first attaching element projecting outward from the rear surface of the back plate, the first attaching element corresponding to the first shaped apertures of the panel; and
      iii) a second attaching element including a flexible lever arm that provides a snap-fit connection when the back plate is attached to the panel, the flexible lever arm including a first end interconnected to the back plate and a second free end, the lever arm having a length defined between the first end and the second free end, the entire length of the lever arm being located within the front and rear planes of the back plate, the second attaching element corresponding to the second shaped apertures of the panel;

iv) wherein the flexible lever arm flexes in a direction parallel to the panel plane when attaching the device to the panel, wherein the securing structure permits a user to selectively attach and detach the cable management device from the front side of the panel without accessing the back side of the panel.

15. The system of claim 14, wherein the flexible lever arm remains within the front and rear planes of the back plate during flexure required to attach and detach the cable management device.

16. The system of claim 14, wherein the cable management device further includes a cable management body extending from the front surface of the back plate, the cable management body including a radius limiting surface that prevents cable from exceeding a minimum bend radius.

17. The system of claim 14, wherein the second attaching element further includes a catch located adjacent to the free end of the flexible lever arm.

18. The system of claim 14, wherein the length of the arm extends in a generally horizontal direction when the device is mounted to the panel.

19. The system of claim 14, wherein the second shaped apertures include a receiving aperture portion and a slide aperture portion, the receiving portion having a radius greater than that of the slide aperture portion.

20. The system of claim 19, wherein the slide aperture portion is sized to capture the second attaching element to axially retain the cable management device relative to the panel.

21. The system of claim 14, wherein the second shaped apertures of the plurality of discrete openings includes a receiving aperture portion, a slide aperture portion, and a notch, the receiving aperture portion being located at a first end of the slide aperture portion, the notch being located at a second end of the slide aperture portion.

22. The system of claim 21, wherein the second attaching element includes a catch disposed adjacent to the free end of the flexible arm, the catch being arranged to engage the notch to provide the snap fit connection.

23. The system of claim 14, further including adjacent telecommunication racks, the panel being mounted between the adjacent telecommunication racks.

24. The system of claim 14, further including a telecommunications enclosure, the panel being mounted within the telecommunications enclosure.

25. A cable management system, comprising:
a) a panel defining a plurality of discrete openings, the discrete openings including first shaped apertures and second shaped apertures, the panel having a front side and a back side; and
b) a cable management device having securing structure that secures the cable management device to the panel at a selected location, the securing structure including:
   i) a back plate having a front surface that defines a front plane and a rear surface that defines a rear plane;
   ii) a first attaching element corresponding to the first shaped apertures of the panel, the first attaching element projecting outward from the rear surface; and
   iii) a second attaching element corresponding to the second shaped apertures of the panel, the second attaching element including a flexible lever arm;
   iv) wherein the entire flexible lever arm remains within the front and rear planes defined by the back plate during flexure required to attach and detach the cable management device, and wherein each of the first and second attaching elements extends beyond the back side of the panel a distance no greater than about 0.08 inches.

* * * * *

UNITED STATES PATENT AND TRADEMARK OFFICE
CERTIFICATE OF CORRECTION

| | | |
|---|---|---|
| PATENT NO. | : 7,764,857 B2 | Page 1 of 1 |
| APPLICATION NO. | : 11/510523 | |
| DATED | : July 27, 2010 | |
| INVENTOR(S) | : Sjodin | |

It is certified that error appears in the above-identified patent and that said Letters Patent is hereby corrected as shown below:

Col. 8, line 6, claim 2: "device an the panel." should read --device and the panel.--

Signed and Sealed this
First Day of March, 2011

David J. Kappos
*Director of the United States Patent and Trademark Office*